US011394419B2

(12) United States Patent
Sharma

(10) Patent No.: US 11,394,419 B2
(45) Date of Patent: Jul. 19, 2022

(54) DEVICE CASE WITH INTEGRATED VISUAL AID SYSTEM

(71) Applicant: Reenal Sharma, Windermere, FL (US)

(72) Inventor: Reenal Sharma, Windermere, FL (US)

(73) Assignee: My Mobile Readers LLC, Windermere, FL (US)

(*) Notice: Subject to any disclaimer, the term of this patent is extended or adjusted under 35 U.S.C. 154(b) by 0 days.

(21) Appl. No.: 16/892,085

(22) Filed: Jun. 3, 2020

(65) Prior Publication Data
US 2021/0384937 A1 Dec. 9, 2021

(51) Int. Cl.
A45C 11/04 (2006.01)
H04B 1/3888 (2015.01)
A45C 11/00 (2006.01)

(52) U.S. Cl.
CPC .......... *H04B 1/3888* (2013.01); *A45C 11/04* (2013.01); *A45C 2011/002* (2013.01)

(58) Field of Classification Search
CPC .. H04B 1/3888; A45C 11/04; A45C 2011/002
USPC .............................. 206/320; 7/118
See application file for complete search history.

(56) References Cited

U.S. PATENT DOCUMENTS

| 6,857,518 | B2* | 2/2005 | Chao ...................... A45C 11/04 206/305 |
| 6,948,409 | B2* | 9/2005 | Ackeret ................ B26B 11/00 7/118 |
| 7,080,423 | B2* | 7/2006 | Seber ...................... B25F 1/003 30/152 |
| 7,984,804 | B2* | 7/2011 | Lebauer ................. A45D 29/18 206/320 |
| 8,833,379 | B1* | 9/2014 | Kaplan ................... A45D 33/26 132/287 |
| 8,967,376 | B1* | 3/2015 | Lewbel ................. G06F 1/1628 206/320 |
| 9,021,641 | B2* | 5/2015 | Leach ...................... B25F 1/04 7/119 |
| 2004/0141313 | A1* | 7/2004 | Elsener ............... F21V 33/0084 362/119 |
| 2009/0265860 | A1* | 10/2009 | Barber ................... B25G 1/085 7/167 |
| 2010/0147710 | A1* | 6/2010 | Lebauer ............... A45C 11/008 206/234 |
| 2011/0253569 | A1* | 10/2011 | Lord ....................... H04M 1/21 206/320 |

* cited by examiner

*Primary Examiner* — Jacob K Ackun
(74) *Attorney, Agent, or Firm* — Jason T. Daniel, Esq.; Daniel Law Offices, P.A.

(57) ABSTRACT

A device case with integrated visual aid system includes a smartphone case body having a bottom wall and a continuous sidewall for receiving and protecting a smartphone device. An elongated, hollow housing is positioned along the bottom surface of the case body and has an opening along one side. A visual aid device having at least one corrective or magnification lens is selectively positioned within the housing and transitions to an extended orientation. In one extended orientation the visual aid device is positioned perpendicular to the case and is located outside of the housing. In another extended orientation the visual aid device is positioned parallel to the case and is located outside of the housing.

12 Claims, 6 Drawing Sheets

DEVICE CASE WITH INTEGRATED VISUAL AID SYSTEM

TECHNICAL FIELD

The present invention relates generally to devices for aiding in vision, and more particularly to a visual aid system for attachment to a portable electronic device.

BACKGROUND

The statements in this section merely provide background information related to the present disclosure and may not constitute prior art.

Visual aid devices such as eyeglasses, and magnifying lenses, for example, have been around for decades. Whether prescription or not, such devices are utilized by people to aid in reading items such as menu's, product labels and other written documents, along with plethora of other uses. Unfortunately, many users routinely forget to bring their glasses, and find themselves in a situation where they need to read something but can't.

In another field of endeavor, advancements in technology have made the average smartphone an essential item for most individuals. Indeed, many individuals routinely forget important items such as their purse, reading glasses and wallets, while remembering to bring their phone whenever they leave their residence.

In light of the above, it would be beneficial to provide a case having an integrated visual aid device that can be secured onto a portable electronic device such as a smartphone, for example, so as to overcome the drawbacks described above.

SUMMARY OF THE INVENTION

The present invention is directed to a device case with integrated visual aid system. One embodiment of the present invention can include a smartphone case body having a bottom wall and a continuous sidewall for receiving and protecting a smartphone device. An elongated, generally rectangular-shaped housing can be positioned along the bottom surface of the case body. The housing including an opening along one side and a hollow interior space for selectively receiving a visual aid device having at least one corrective or magnification lens.

In one embodiment, a pivot hinge is positioned within the housing and is in communication with the visual aid device to transition the device between a retracted position and an extended position. In the retracted position, the visual aid device is positioned parallel with the case and is located completely inside the housing. In the extended position, the visual aid device is positioned perpendicular to the case and is located outside of the housing.

In one embodiment, a pair of sliding hinges are positioned within the housing and are in communication with the visual aid device to transition the device between a retracted position and an extended position. In the retracted position, the visual aid device is positioned parallel with the case and is located completely inside the housing. In the extended position, the visual aid device is positioned parallel to the case and is located outside of the housing.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1A:
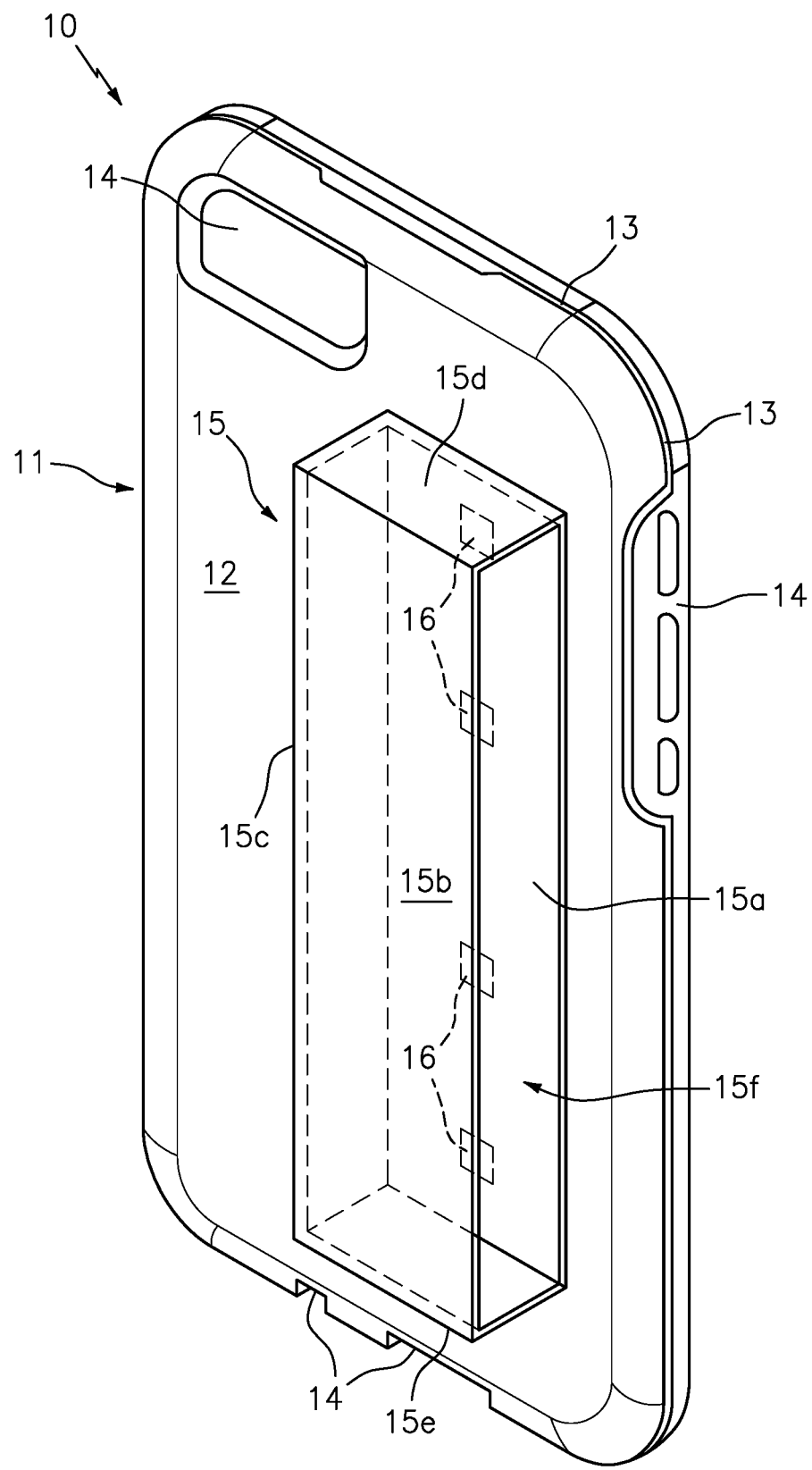
FIG. 1A is a perspective view of the device case with integrated visual aid system that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the invention.

DEFINITIONS

As described herein, the term "removably secured," and derivatives thereof shall be used to describe a situation wherein two or more objects are joined together in a non-permanent manner so as to allow the same objects to be repeatedly joined and separated.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

As described herein, the term "connector" can include any number of different elements that work alone or together to join two items together in a permanent or non-permanent manner. Several nonlimiting examples include opposing strips of hook and loop material (i.e. Velcro®), attractively-oriented magnetic elements, adhesives such as glue or resin, tape, double sided tape, flexible strips of interlocking projections with a slider (i.e., zipper), tethers, buckles such as side release buckles, and compression fittings such as T-handle rubber draw latches, hooks, snaps and buttons, for example. Each illustrated connector and complementary connector can be permanently secured to the illustrated portion of the device via a permanent sealer such as glue, adhesive tape, or stitching, for example.

As described herein, the term "pivotally connected" "rotatably secured" and derivatives thereof shall be used interchangeably to describe a situation wherein two identified objects are joined together in a manner that allows one or both of the objects to pivot, and/or rotate about or in relation to the other object in one or both of a horizontal or vertical manner. Several nonlimiting examples of hinges for pivotally connecting objects together include traditional single hinge mechanisms, ball joint couplers, and/or swivel flanges, for example.

As described throughout this document, the term "about" "approximately" "substantially" and "generally" shall be used interchangeably to describe a feature, shape or measurement of a component within a tolerance such as, for example, manufacturing tolerances, measurement tolerances or the like.

Although described and illustrated for use with a smartphone, this is for illustrative purposes only. To this end, the inventive system can be manufactured for use with any number of other portable electronic devices and/or articles that can be carried by a person. Several nonlimiting examples of a portable electronic device for use herewith include, but are not limited to computer tablets, E-readers, and/or wearable portable electronic devices, for example.

FIGS. 1A-3B illustrate one embodiment of a device case with integrated visual aid system 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1A.

As shown, the system 10 can include, essentially, a smartphone attachment case 11, and a housing 15 containing a retractable visual aid device 21.

The attachment case 11 can function to receive and engage a portable electronic device such as a smartphone, for example. In one embodiment, the case 11 can include a bottom wall 12 and a continuous raised sidewall 13 extending away therefrom. Each case 11 can be manufactured to include a shape and size that is complementary to the shape and size of a conventional smartphone, so as to allow the smartphone to be positioned therein. In this regard, when so positioned, the bottom surface of the smartphone will be in contact with the inside facing surface of the bottom wall 12, and the sidewall 13 will surround the smart phone body.

In the preferred embodiment, the attachment case 11 can be manufactured from a single mold of injected plastic for protecting the smart phone from impact damage. Of course, any number of other materials that are, for example, relatively strong and stiff for their weight are also contemplated. In either instance, the case 11 can include a plurality of openings 14 each extending therethrough for allowing operation of the smartphone camera, light, speaker and/or buttons, for example.

In one embodiment, the housing 15 can include an elongated, hollow and generally rectangular-shaped member having a bottom wall 15a, a top wall 15b, a sidewall 15c a pair of ends 15d and 15e, and an opening 15f that leads to the hollow interior space. In one embodiment, a plurality of connectors 16 can be disposed between the housing 15 and the case body 12. Each of the connectors functioning to secure the case to the housing in either a permanent or removable manner such that the major axis of the attachment case and housing are parallel.

As described herein, the housing can be constructed from the same materials as the attachment case 11 so as to be formed as an integral component thereto, or as a separate component that is attached via the connectors. Additionally, the housing may also be constructed from any number of other types of materials, such as leather or vinyl, for example. Although described above as including a specific orientation, this is for illustrative purposes only, as the housing can be positioned at a different angle relative to the case.

Figure 1B:
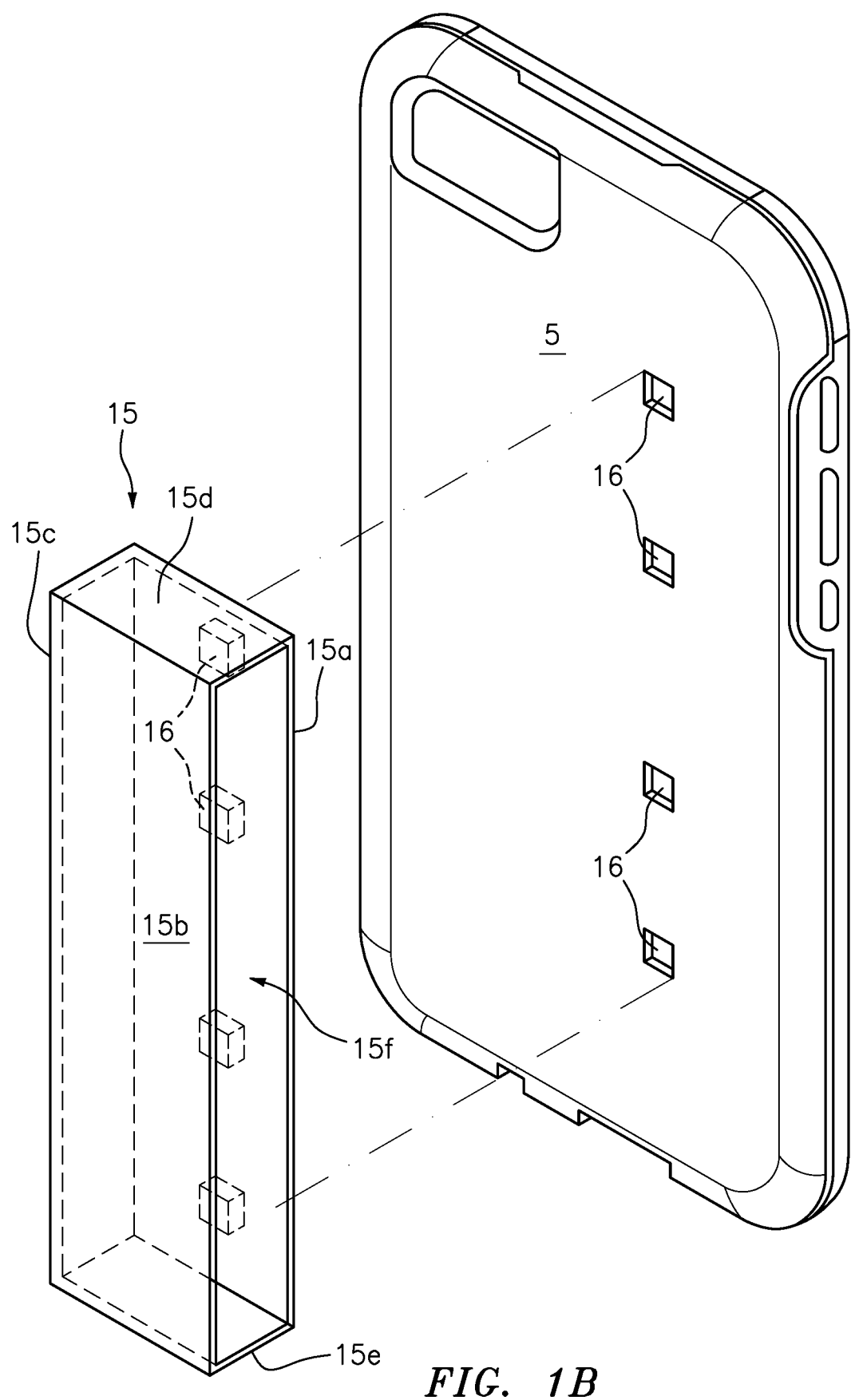
FIG. 1B is another perspective view of the device case with integrated visual aid system that is useful for understanding the inventive concepts disclosed herein.

In one embodiment shown at FIG. 1B, the housing 15 can be can be secured directly onto an end user's existing case or smartphone via one or more of the connectors 16.

As described herein, the visual aid device can include any type of vision enhancement component or corrective components. In the preferred embodiment, the visual aid device 21 can include, comprise or consist of at least one lens having a convex or concave surface that is constructed in accordance with known manufacturing processes to include a specific magnification, or vision prescription. To this end, each of the at least one lens can include optional features such as an anti-reflective coating, polarization, bifocal or trifocal properties, for example.

In one embodiment, a frame 22 can be positioned along an outer periphery of the vision aid device 21. The frame 22 can preferably be constructed from plastic, or other hardened materials for protecting the device 21 from impact damage. In one embodiment, the frame can extend along the entire outer periphery of the device 21 and can include an enlarged side portion 23 having a shape and size that is complementary to the opening 15f of the housing 15.

Although illustrated as including a continuous frame about the entire periphery of the lens(s) 21, this is for illustrative purposes only. To this end, other embodiments are contemplated wherein the frame is positioned along only a portion of the lens(s) 21 and/or wherein the frame is not provided and the below described hinge(s) is/are secured directly to the lens.

Figure 2A:
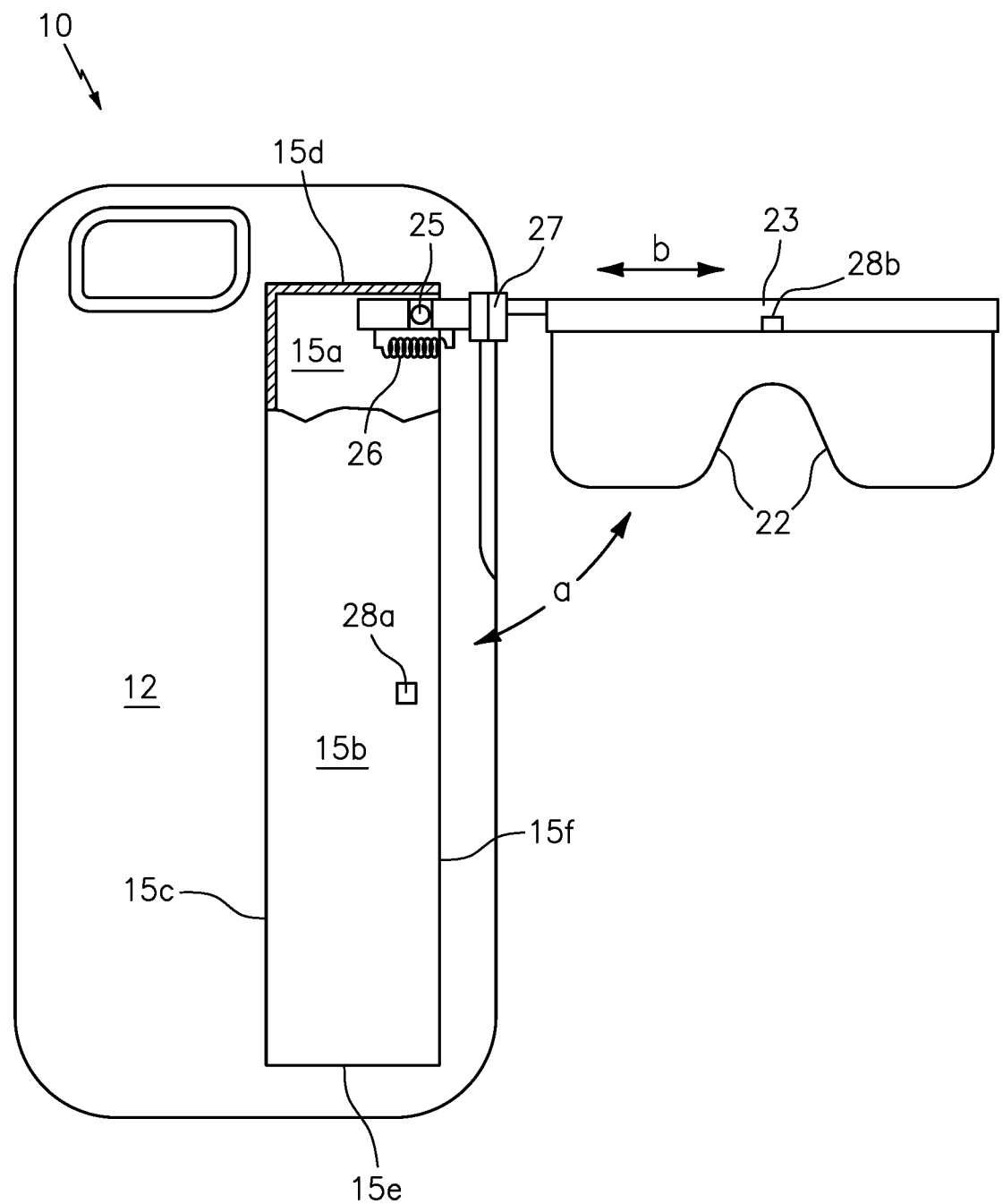
FIG. 2A is a perspective view of the device case with integrated visual aid system in the extended position wherein a portion of the housing wall is removed for ease of illustration, in accordance with one embodiment.
Figure 2B:
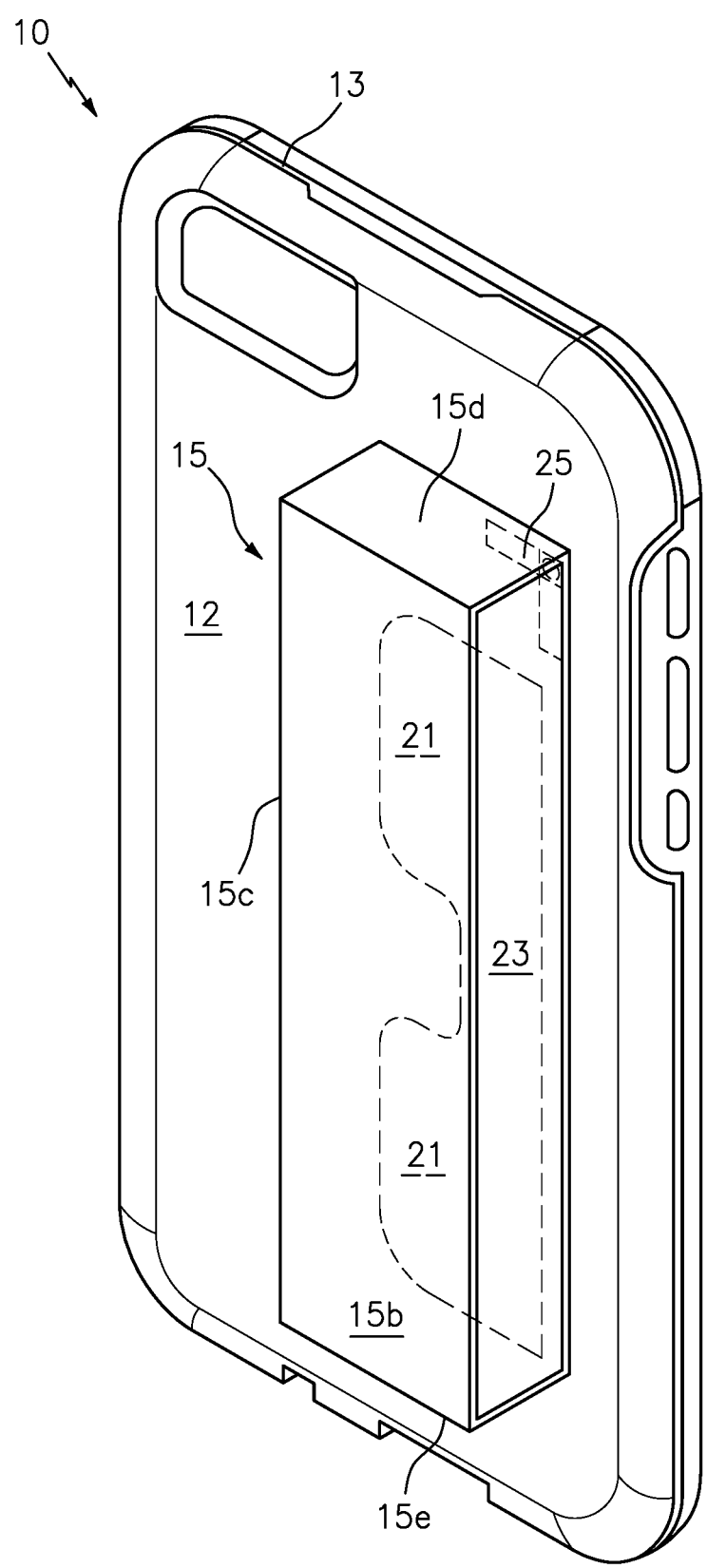
FIG. 2B is a perspective view of the device case with integrated visual aid system in the retracted position, in accordance with one embodiment.

As shown at FIG. 2A, one embodiment of the system 10 can include a pivot hinge 25 that is positioned within the interior space of the housing. As shown by arrow a, the hinge 25 can transition the device 21 between the illustrated extended position, and a retracted position (FIG. 2B). When in the extended position, the visual aid device 21 is positioned outside of the housing 15 such that the major axis of the device 21 is perpendicular to the case 11.

In this regard, when the device 21 is in the extended position, a user can see through the lens to view objects such as a menu, for example. Moreover, because the lens is positioned away from the smartphone itself, the system advantageously allows operation of the smartphone light and/or camera during use, so as to illuminate the object being read through the device.

FIG. 2B illustrates one embodiment of the device 21 in the retracted position wherein the enlarged side portion 23 of the frame is in contact with walls of the housing 15 so as to completely cover the opening 15f. When so positioned, the entire device 21 will be fully enclosed within the interior space of the housing, so as to be protected from impact damage along all sides, and the major axis of the device 21 will be parallel to the major axis of the case 11.

As described herein, the pivot hinge 25 is appreciated to be any conventional mechanism known to the art, such as an elbow hinge, for example, capable of moving the device 21 between the retracted position and the extended position.

In various embodiments, the pivot hinge can include a biasing member such as a spring 26, for example, so as automatically position the visual aid device in the retracted or extended position. Likewise, the pivot hinge can include a telescoping arm 27 that is interposed between the hinge and frame so as to allow a user to adjust (see arrow b) how far the device 21 extends outward from the case 11. In one embodiment, a push button 28*a* and notch 28*b* can be positioned along housing and device so as to selectively actuate movement of the device via the spring 26.

Although described above as including a single hinge mechanism for pivotally connecting the device 21 and housing 15, other embodiments are also contemplated.

Figure 3A:
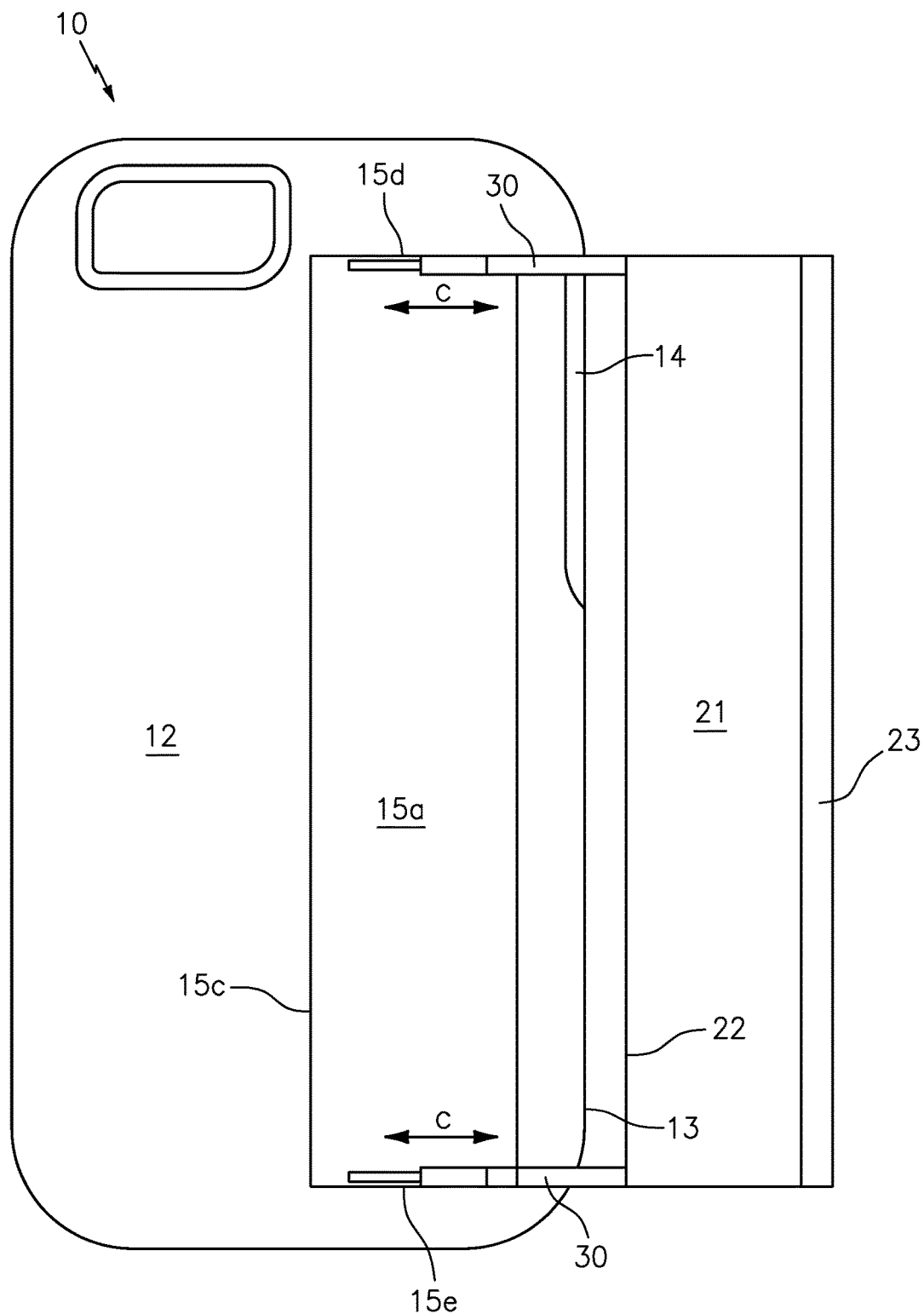
FIG. 3A is another perspective view of the device case with integrated visual aid system in the extended position wherein the housing wall is removed for ease of illustration, in accordance with one embodiment.

To this end, FIG. 3A illustrates one embodiment of the system 10 wherein the vision aid device 21 includes one or more slide hinges 30. As shown by arrows c, each of the hinges 30 can function to slidingly transition the device 21 between the illustrated extended position, and a retracted position (FIG. 3B).

When in this extended position, the visual aid device 21 is positioned outside of the housing 15 such that the major axis of the device 21 is parallel to the case 11. When so positioned, a user can see through the lens to view objects such as a menu, for example, and can also utilize the smartphone light for illumination.

As described herein, the slide hinges 30 are appreciated to be any conventional mechanism known to the art, such as a drawer slide or other telescoping member, for example, capable of moving the device 21 linearly.

Figure 3B:
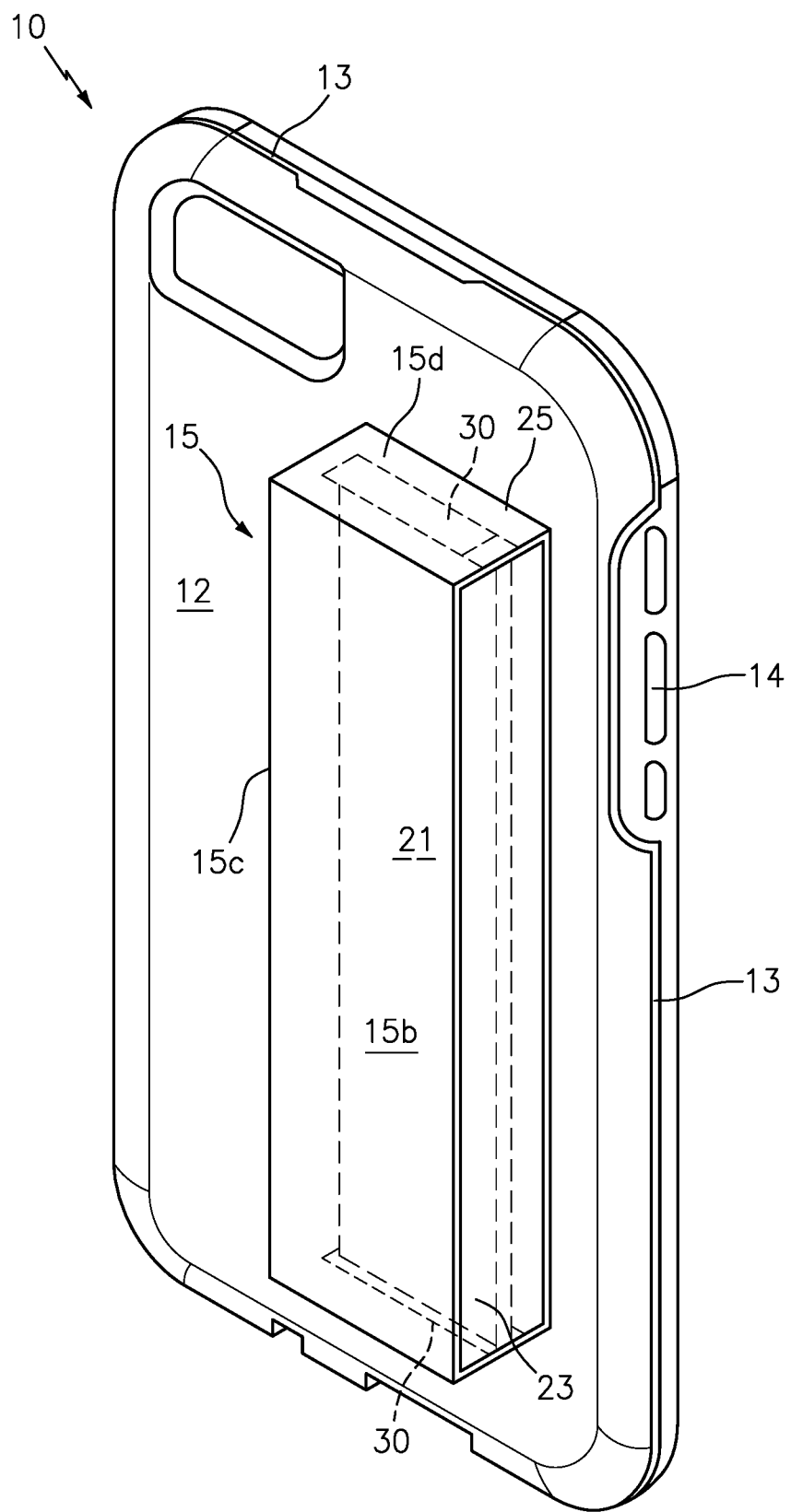
FIG. 3B is another perspective view of the device case with integrated visual aid system in the retracted position, in accordance with one embodiment.

FIG. 3B illustrates the device of FIG. 3A in the retracted position wherein the hinges are withdraw the device 21 into the interior space of the housing until the enlarged side portion 23 of the frame is in contact with walls of the housing so as to completely cover the opening 15*f*. When so positioned, the entire device 21 will be positioned parallel to the case 11 and will be fully enclosed within the interior space of the housing, so as to be protected from impact damage along all sides.

Accordingly, the above described device case with integrated visual aid system 10 advantageously provides users with access to a visual aid device whenever they have their cellular telephone, while providing impact protection for the same in a novel manner.

Although not specifically illustrated, the visual aid device can be removably secured to the hinge 25 or hinges 30 so as to be removable for use separate from the system. Such a feature can also allow a user to utilize their own glasses with the system.

As described herein, one or more elements of the inventive system 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A case with visual aid system, said system comprising:
   a case body having a bottom wall and a continuous sidewall, said case body being configured to removably receive a portable electronic device;
   a housing;
   a visual aid device that is in communication with the housing, said visual aid device being configured to transition between an extended position and a retracted position when the housing is secured along the case body; and
   a pivot hinge that is interposed between the visual aid device and the housing.

2. The case with visual aid system of claim 1, wherein the visual aid device comprises:
   at least one lens having for enhancing or correcting a vision of a user.

3. The case with visual aid system of claim 1, further comprising:
   a frame that extends along a periphery of the visual aid device.

4. The case with visual aid system of claim 1, wherein the housing comprises:
   a generally rectangular-shaped member having a plurality of walls, a hollow interior and an opening along one side.

5. The case with visual aid system of claim 4, wherein the hinge is a pivot hinge.

6. The case with visual aid system of claim 5, wherein in the extended position the visual aid device is positioned perpendicular to the housing, and the visual aid device is located outside of the housing.

7. The case with visual aid system of claim 6, wherein in the retracted position, the visual aid device is positioned within the hollow interior of the housing.

8. The case with visual aid system of claim 1, further comprising:
   a push button that is positioned along the housing, said push button functioning to actuate the visual aid device to transition between the extended position and the retracted position.

9. The case with visual aid system of claim 1, wherein the case body is constructed from a rigid material for protecting the portable electronic device from an impact damage.

10. The case with visual aid system of claim 1, wherein the hinge is a sliding hinge, wherein the sliding hinge is configured to slidingly transition the visual aid device between the extended position and the retracted position.

11. The case with visual aid system of claim 1, further comprising another hinge, wherein the hinge and the another hinge are configured to slidingly transition the visual aid device between the extended position and the retracted position.

12. A case with visual aid system, said system comprising:
   a case body having a bottom wall and a continuous sidewall, said case body being configured to removably receive a portable electronic device;
   a housing;
   a visual aid device that is in communication with the housing, said visual aid device being configured to slidingly transition between an extended position and a retracted position when the housing is secured along the case body; and
   a slide hinge that is interposed between the visual aid device and the housing.

* * * * *